US012220645B2

(12) United States Patent
Sullivan

(10) Patent No.: US 12,220,645 B2
(45) Date of Patent: Feb. 11, 2025

(54) METHODS AND SYSTEMS FOR FACILITATING INTRA-GAME COMMUNICATIONS IN A VIDEO GAME ENVIRONMENT

(71) Applicant: Adeia Guides Inc., San Jose, CA (US)

(72) Inventor: Curtis Sullivan, San Jose, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/410,332

(22) Filed: Jan. 11, 2024

(65) Prior Publication Data

US 2024/0149173 A1 May 9, 2024

Related U.S. Application Data

(63) Continuation of application No. 17/070,613, filed on Oct. 14, 2020, now Pat. No. 11,904,246, which is a continuation of application No. 16/015,885, filed on Jun. 22, 2018, now Pat. No. 10,843,089.

(60) Provisional application No. 62/653,840, filed on Apr. 6, 2018.

(51) Int. Cl.
*A63F 13/00* (2014.01)
*A63F 13/87* (2014.01)

(52) U.S. Cl.
CPC .................................. *A63F 13/87* (2014.09)

(58) Field of Classification Search
CPC ........ A63F 13/87; A63F 13/53; A63F 13/537; A63F 13/5375; A63F 13/20; A63F 13/21
See application file for complete search history.

(56) References Cited

U.S. PATENT DOCUMENTS

| | | | | |
|---|---|---|---|---|
| 5,574,836 A * | 11/1996 | Broemmelsiek | ..... | H04N 13/279 348/E13.019 |
| 5,742,289 A * | 4/1998 | Naylor | ................ | H04N 19/51 375/E7.176 |
| 5,870,074 A * | 2/1999 | Iwasaki | ................ | G09G 5/42 345/25 |
| 5,870,097 A * | 2/1999 | Snyder | ................ | G06T 13/80 345/422 |
| 6,326,963 B1 * | 12/2001 | Meehan | ................ | G06T 19/00 345/473 |
| 6,377,277 B1 * | 4/2002 | Yamamoto | ............. | A63F 13/57 345/629 |
| 7,761,892 B2 | 7/2010 | Ellis et al. | | |
| 7,815,507 B2 * | 10/2010 | Parrott | ................ | G07F 17/32 345/157 |
| 8,046,801 B2 | 10/2011 | Ellis et al. | | |
| 9,294,819 B2 | 3/2016 | Lee et al. | | |
| 9,387,401 B2 | 7/2016 | Knutsson et al. | | |
| 9,762,641 B2 * | 9/2017 | Van Wie | ............. | G06F 3/04815 |
| 9,799,161 B2 * | 10/2017 | Froy | ................ | G07F 17/3227 |
| 10,195,525 B2 * | 2/2019 | Idris | ................ | A63F 13/211 |
| 10,366,514 B2 * | 7/2019 | Leacock | ............ | H04L 51/043 |
| 10,650,644 B2 * | 5/2020 | Comeau | ............ | G07F 17/3206 |
| 10,843,089 B2 | 11/2020 | Sullivan | | |

(Continued)

*Primary Examiner* — Dmitry Suhol
*Assistant Examiner* — Jason Pinheiro
(74) *Attorney, Agent, or Firm* — HALEY GUILIANO LLP

(57) ABSTRACT

Methods and systems for facilitating intra-game communication in video game environments featuring first-person or third-person perspectives by generating an on-screen graphic that includes the communication and a pointer towards a location of another user within the video game environment.

18 Claims, 7 Drawing Sheets

(56) References Cited

U.S. PATENT DOCUMENTS

| | | | |
|---|---|---|---|
| 2001/0040572 A1* | 11/2001 | Bradski | G06F 3/011 345/419 |
| 2002/0022518 A1* | 2/2002 | Okuda | A63F 13/213 463/36 |
| 2002/0151337 A1* | 10/2002 | Yamashita | A63F 13/08 463/8 |
| 2004/0166937 A1* | 8/2004 | Rothschild | G07F 17/32 463/36 |
| 2005/0075885 A1* | 4/2005 | Danieli | A63F 13/5372 704/276 |
| 2005/0248570 A1* | 11/2005 | Stelly, III | G06T 17/20 345/423 |
| 2005/0251827 A1 | 11/2005 | Ellis et al. | |
| 2006/0046844 A1* | 3/2006 | Kaneko | A63F 13/40 463/32 |
| 2006/0128468 A1* | 6/2006 | Yoshikawa | A63F 13/26 463/36 |
| 2007/0259716 A1* | 11/2007 | Mattice | G07F 17/32 463/36 |
| 2008/0215679 A1 | 9/2008 | Gillo et al. | |
| 2008/0215971 A1 | 9/2008 | Gillo et al. | |
| 2008/0215973 A1* | 9/2008 | Zalewski | A63F 13/77 715/764 |
| 2008/0242427 A1* | 10/2008 | Namba | A63F 13/42 463/43 |
| 2010/0222143 A1* | 9/2010 | Endo | A63F 13/22 463/43 |
| 2010/0304806 A1* | 12/2010 | Coleman | A63F 13/69 463/2 |
| 2010/0304862 A1 | 12/2010 | Coleman et al. | |
| 2010/0333037 A1* | 12/2010 | Pavlovski | G06F 3/0481 715/848 |
| 2011/0004841 A1* | 1/2011 | Gildred | H04N 1/00453 715/780 |
| 2012/0115594 A1* | 5/2012 | Hornik | G07F 17/3258 463/27 |
| 2012/0172119 A1* | 7/2012 | Kelly | A63F 13/00 463/31 |
| 2012/0322527 A1 | 12/2012 | Aoki et al. | |
| 2013/0023337 A1* | 1/2013 | Bowers | G07F 17/3209 463/25 |
| 2013/0084978 A1* | 4/2013 | Olomskiy | A63F 13/87 463/31 |
| 2014/0181229 A1* | 6/2014 | Tucker | H04L 12/1827 709/206 |
| 2019/0308109 A1 | 10/2019 | Sullivan | |
| 2021/0093977 A1 | 4/2021 | Sullivan | |
| 2024/0050857 A1* | 2/2024 | Patel | A63F 13/67 |

* cited by examiner

METHODS AND SYSTEMS FOR FACILITATING INTRA-GAME COMMUNICATIONS IN A VIDEO GAME ENVIRONMENT

CROSS-REFERENCES TO RELATED APPLICATIONS

This application is a continuation of U.S. patent application Ser. No. 17/070,613, filed Oct. 14, 2020, which is a continuation of U.S. patent application Ser. No. 16/015,885, filed Jun. 22, 2018, now U.S. Pat. No. 10,843,089, which claims the benefit of U.S. Provisional Patent Application No. 62/653,840, filed Apr. 6, 2018, which are is hereby incorporated by reference herein their entireties.

BACKGROUND

While traditionally catering to an individual user's experience, video games, whether experienced through a traditional display device such as a television, computer, etc., or through wearable electronics or augmented reality/virtual reality devices, have increasingly become a group viewing experience. For example, video games now let users interact with one another through the video game environment. In typical scenarios, multiple users, at disparate locations, log in (e.g., via the Internet) to a common platform that hosts the video game environment.

The video game environment may be rendered as a two-dimensional space or a three-dimensional space, and users are typically represented in the video game environment by an avatar. The user's avatar may move freely around the video game environment, and the avatar may be displayed to other users sharing the video game environment. While in this video game environment, users can move around the video game environment. A three-dimensional video game environment is typically defined by a series of planes that define the boundaries of the video game environment, in which users may move around. Additionally, objects may be modeled and placed within the boundaries of the video game environment. These objects may form additional boundaries to movement by of the avatar and/or may be interacted with by an avatar. For example, an avatar may not be able to move through an object designed to appear as a table in a video game environment, but may be able to move under or stand on top of the table.

Additionally, these objects may block a line of sight of the user. For example, in addition to being unable to move through the object in the video game environment, a user may not be able to see through the object. This technique is typically used in video game environments to prevent one user from being able to view the position of the avatars of other users, which in many cases adds to the enjoyment of the user. For example, the video game environment mimics the real world in which a person cannot see another person hiding behind a wall.

The techniques used to model video game environments, and the objects within these video game environments, in order to create environments in which the visual depth and dimensions of the video game environment accurately reflect the spacing and placement of objects and avatars are well known. However, the physics of how objects move throughout the video game environment are less well known, particularly as the mathematical algorithms necessary to define an object's movement through the video game environment become more complex. This is especially true for video game environment features that cannot be modeled as objects, such as light, shadow, and sound, and that are themselves dependent on the positions of other objects within the video game environment. For example, if one user wishes to verbally communicate with another user, the complexity of causing an audio communication to appear to originate from that avatar prevents the video game from accurately rendering this communication.

SUMMARY

Accordingly, methods and systems are described herein for a video game application that facilitates intra-game communication in video game environments featuring first-person or third-person perspectives. To improve audio communication between users, the video game application uses the unconventional approach of rendering visual cues to a user about the positions of avatars associated with other users that are currently communicating with them. For example, conventional systems increasingly attempt to create real-world immersion for users by providing more options for audio interaction such as allowing users to speak into microphones that can be heard through the headphones or speakers of other users. However, this arrangement only exacerbates the problem, as video game environments, particularly massive multiplayer online games ("MMOGs") or first-person shooters ("FPS"), increasingly add the number of players that can simultaneously exist in video game environments. Moreover, the headphones or speakers of users typically are not advanced enough to provide true surround sound. Likewise, the headphones or speakers have no way of interpreting and/or modifying incoming signals based on the position of another avatar, particularly if that other avatar is behind a wall or other object in the video game environment that would distort how the user heard the communication. Accordingly, despite enabling audio communications, most video game environments are unable to accurately render these communications in a way in which a user receiving the communication can determine the source and/or the location of the source within the video game environment, particularly when that source is not within a line of sight of the user.

To overcome these problems, the aforementioned video game application renders visual cues to a user about the positions of avatars associated with other users that are currently communicating with them. While counter to the prevailing systems, which aim to rely solely on audio solutions to audio problems in video game environments, the video game application solves these problems using a novel hybrid audio/video approach. Furthermore, the video game application solves yet another problem that could arise in this novel audio/video approach, about where to position visual cues concerning audio communications with respect to both a user interaction that caused the communication and the objects and boundaries of the video game environment.

For example, the video game application facilitates intra-game communication in video game environments featuring first-person or third-person perspectives. The video game application does this by determining a first location of a first user within a video game environment (e.g., the location of the avatar of the first user within the boundaries of the video game environment) and determining a second location of a second user within the video game environment (e.g., the location of the avatar of the second user within the boundaries of the video game environment). The video game application then detects a user interaction of the second user (e.g., the user expressing an audio communication) with the video game environment and determines a trajectory from the first location to the second location within the video game environment. The video game application then generates an on-screen graphic associated with the user interaction, wherein the on-screen graphic points along the trajectory. By generating the on-screen graphic with the pointer, the video game application relieves the need to accurately render the audio communication to appear to originate from the second user. Likewise, the pointer informs the first user which of the other users is making the communication as well as the second user's location, relative to the first user, even if that location is behind a wall or object, effectively overcoming the aforementioned problems.

In some aspects, the video game application facilitates intra-game communication in video game environments featuring first-person or third-person perspectives. For example, video game environments featuring first-person or third-person perspectives require three-dimensional rendering of the video game environments, in which avatars associated with a user may move. As stated above, rendering features in three-dimensional environments that cannot themselves be modeled as three-dimensional objects, such as audio communications, and are themselves dependent on the positions of other objects (e.g., a user issuing the audio communication) within the video game environment, pose significant problems to the user experience that are overcome by the aforementioned video game application.

The video game application may determine, using control circuitry upon which the video game application is implemented, a first location of a first user within a video game environment and a second location of a second user within the video game environment. The video game application may determine this location based on x, y, z coordinates of each avatar in the video game environment relative to the x, y, z coordinates defining the video game environment (and objects within the video game environment). For example, the location of the users may correspond to the locations of the respective avatars (e.g., a center point of the avatar, a three-dimensional space of the video game environment that is currently occupied by the avatar, or a point, e.g., corresponding to a line of sight, within the three-dimensional space of the video game environment, that is currently occupied by the avatar, and/or any other area within the video game environment occupied by an avatar of the first user) of the users. By determining the locations of the users, the video game application can establish a trajectory between the two users that can be used when facilitating audio communications between the users.

The video game application may detect, using the control circuitry, a user interaction of the second user with the video game environment. For example, a user interaction may include an audio communication (e.g., directed at one or more other users) or other action performed by the user in the video game environment that corresponds to an in-game sound (e.g., walking, opening a door, firing a gun, etc.). By detecting the user interaction, the video game application is triggered to generate the hybrid audio/video approach to communicating the user interaction within the video game environment.

The video game application may determine, using the control circuitry, an on-screen graphic location for an on-screen graphic corresponding to the user interaction. The video game application may determine this location based on a plurality of factors in order to reflect the conditions and positions of objects in the video game environment. For example, the video game application may key the location of the on-screen graphic to the line of sight of the first user. By doing so, the video game application provides an intuitive pointer to the second user. Moreover, if the second user is not within the line of sight of the first user (e.g., the second user is behind an object in the video game environment), the video game application may present the on-screen graphic within the line of sight of the user with a point through the object. By doing so, the video game application indicates to the first user that the second user is behind the object.

For example, the video game application may determine the location of the on-screen graphic by determining line-of-sight boundaries, within the video game environment, from a perspective of the first user at the first location (e.g., determining the x, y, z coordinates that define the surfaces of objects and boundaries in the video game environment). The video game application may determine a first trajectory from the first location to the second location within the video game environment. For example, by determining the trajectory from the first location to the second location, the video game application may determine both the trajectory of a pointer of the on-screen graphic, line-of-sight boundaries between the users, and/or a distance between the first and second location.

The video game application may determine a line-of-sight boundary, of the line-of sight boundaries, intersected by the first trajectory. For example, the video game application may determine a plane in the three-dimensional boundaries of the video game environment that is intersected by the trajectory. The video game application may determine a first point in the line-of-sight boundary that is intersected by the first trajectory. For example, the point may correspond to the point at which the plane in the three-dimensional boundaries of the video game environment is intersected by the trajectory. The video game application may then determine a plane that includes the first point and is perpendicular to a line of sight of the first user and select the on-screen graphic location within the plane. By determining the plane that includes the first point and is perpendicular to a line of sight of the first user and locating the on-screen graphic within that plane, the on-screen graphic may appear to the first user in a two-dimensional form, which can easily be read. Furthermore, by locating the on-screen graphic within that plane, the first user is intuitively cued to the location of the second user without the need for the pointer.

The video game application may then determine, using the control circuitry, a second trajectory from the on-screen graphic location to the first point and may generate the on-screen graphic at the on-screen graphic location, wherein the on-screen graphic includes a pointer along the second trajectory. For example, the on-screen graphic may appear as a text box with a transcription, emoji, etc., corresponding to the user interaction. The pointer may point from this graphic to the location of the second user. The point may further provide the first user with an intuitive cue to the location of the second user.

In some embodiments, the video game application may modify the size of the on-screen graphic to further provide intuitive cues to the location of the second user. For example, the video game application may determine a size of the on-screen graphic based on a distance, within the video game environment, between the first location and the second location. In such cases, user interactions from users closer to the first user may appear bigger (e.g., imitating the real-world condition that sounds are heard as louder the closer the user is to the source of the sound) than similar user interactions from users farther away. In another example, the video game application may determine a size of the on-screen graphic based on a ratio between a first distance and a second distance, wherein the first distance equals a distance, within the video game environment, between the first location and the first point along the first trajectory, and wherein the second distance equals a distance, within the video game environment, between the first point and the second location along the first trajectory. In such cases, user interactions from users at a short distance behind a wall, in the video game environment, that is a long distance from the first user, would appear differently than users at a long distance behind a wall, in the video game environment, that is a short distance from the first user, even though the total distance is the same in each case (e.g., imitating the real-world condition that sound may be prevented by a solid object, but quickly disperse after penetrating the solid object).

In some embodiments, the video game application may compare the user interaction to a database listing presentation formats associated with different user interactions to determine a presentation format of the on-screen graphic associated with the user interaction. For example, the video game application may have presentation formats that are specific to particular user interactions (e.g., red boxes for audio communications, custom designs for specific in-game actions, etc.). By providing the different presentation formats, the intuitiveness of the cues is further increased.

In some embodiments, the video game application may determine whether or not to present an on-screen graphic (e.g., despite receiving a user interaction) based on the distance between the first and second user. For example, the video game application may determine a distance, within the video game environment, between the first location and the second location, and compare the distance to a threshold distance. In response to the video game application determining that the distance is within the threshold distance, the video game application may determine to generate for display the on-screen graphic. Alternatively, in response to the video game application determining that the distance is equal to or exceeds the threshold distance, the video game application may determine not to generate for display the on-screen graphic. By performing this determination, the video game application mimics real-world environments, in which a person may hear only user interactions that occur in close proximity to his location. Alternatively or additionally, in response to the video game application determining that the distance is equal to or exceeds the threshold distance, the video game application identifies a second point based on a position of the second user on an on-screen map, determines a third trajectory from the on-screen graphic location to the second point, and generates the on-screen graphic at the on-screen graphic location, wherein the on-screen graphic includes a pointer along the third trajectory. For example, if the video game application determines that the second user is not within a threshold proximity such that generating the on-screen graphic pointing to the user effectively indicates the location of the second user, the video game application may instead point to the second user's location in a map of the video game environment.

It should be noted that in addition to indicating user interactions, the methods and systems described herein could be used to indicate any content on screen. For example, close captioning dialogue boxes or other on-screen information could be presented in the on-screen graphic discussed herein. In such cases, the on-screen graphics could point to the origin of the dialogue or other information.

It should be noted, the systems and/or methods described above may be combined with, applied to, or used in accordance with, other systems, methods and/or apparatuses discussed both above and below.

BRIEF DESCRIPTION OF DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF DRAWINGS

Figure 1:
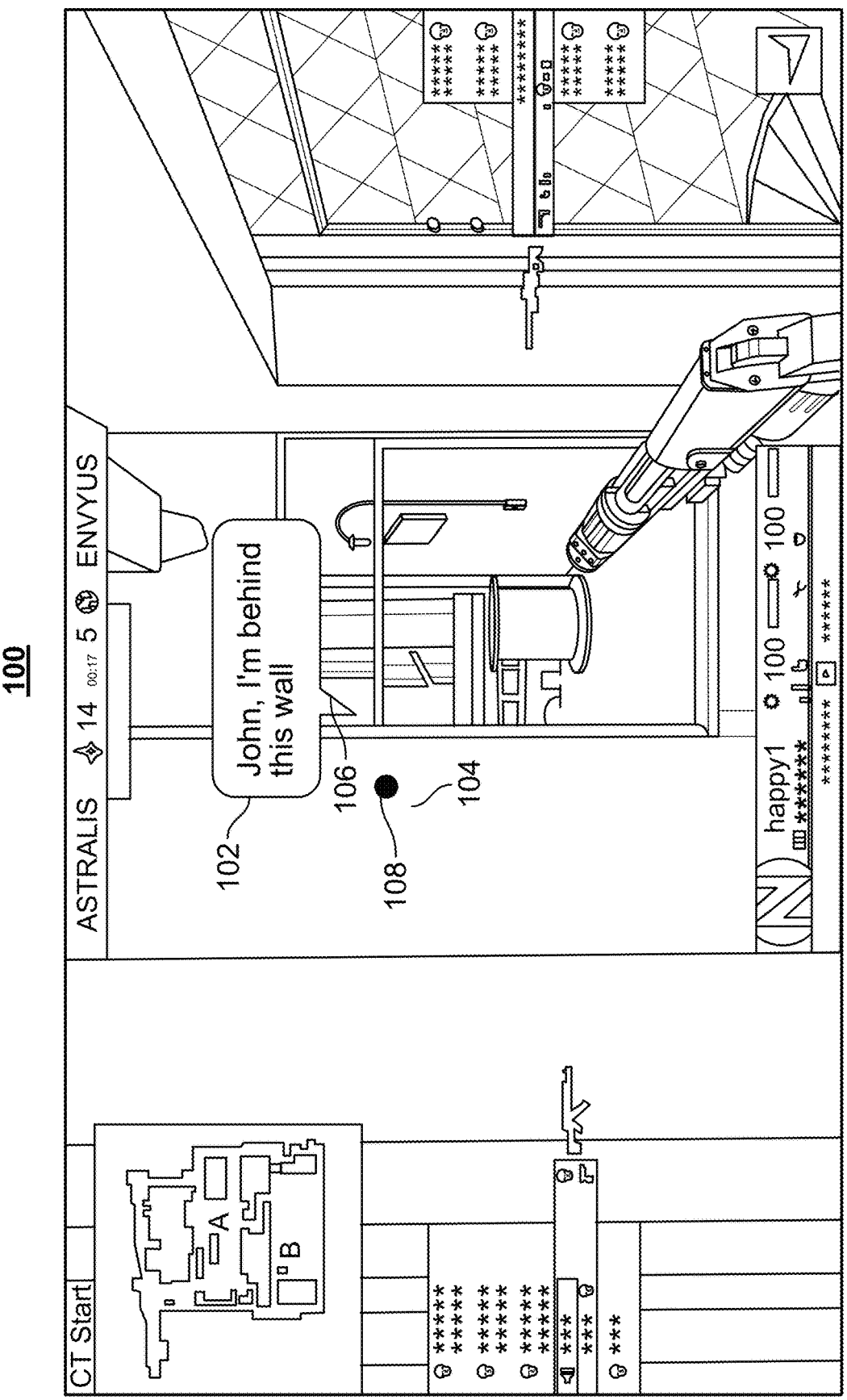
FIG. 1 shows an illustrative example of a video game application that displays an on-screen graphic in a first-person perspective in accordance with some embodiments of the disclosure.

Methods and systems are described herein for a video game application that facilitates intra-game communication in video game environments featuring first-person or third-person perspectives by rendering visual cues to a user about the positions of avatars associated with other users that are currently communicating with them. FIG. 1 shows an illustrative example of a video game application that displays an on-screen graphic in a first-person perspective in order to cue the user to the position of avatars associated with other users that are currently communicating. For example, in order to generate on-screen graphic 102, the video game application determines a first location of a first user within a video game environment (e.g., the location of the avatar of the first user within the boundaries of the video game environment) and determines a second location of a second user within the video game environment (e.g., the location of the avatar of the second user within the boundaries of the video game environment). The video game application then detects a user interaction of the second user (e.g., the user expressing an audio communication) with the video game environment, and determines a trajectory from the first location to the second location within the video game environment. The video game application then generates an on-screen graphic associated with the user interaction, wherein the on-screen graphic (e.g., on-screen graphic 102) points (e.g., via pointer 106) along the trajectory.

Figure 5:
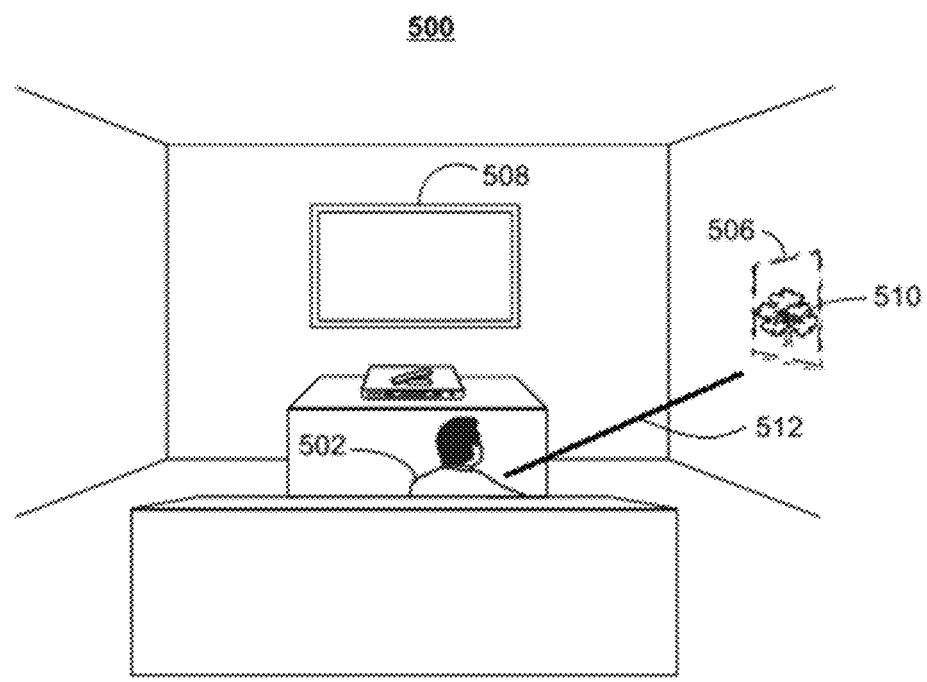
FIG. 5 shows an illustrative example of a video game application that displays an on-screen graphic in a third-person perspective in accordance with some embodiments of the disclosure.

For example, in FIG. 1, the video game application facilitates intra-game communication in video game environments featuring first-person or third-person perspectives by generating on-screen graphic 102. As shown in FIG. 1, the video game environment is displayed to a user in a first-person perspective. However, the video game application may also render video game environments in a third-person perspective (e.g., as shown in FIG. 5) or through the use of virtual reality or augmented reality hardware and/or applications (e.g., as discussed in FIG. 7 below). As referred to herein, "a video game environment" may include any surroundings or conditions in which a video game occurs. For example, an environment may be a three-dimensional environment (e.g., featuring three-dimensional models and/or textures) or the video game environment may be a virtual or augmented reality environment (e.g., featuring a virtual world or a view in which computer-generated images are superimposed on a user's view of the real world). As referred to herein, "a video game" may include any electronic presentation that involves interaction with a user interface to generate audio/visual feedback on a video device such as a TV screen, wearable electronic device, and/or computer monitor.

In FIG. 1, the video game application may determine, using control circuitry (e.g., control circuitry 304 (FIG. 3) as discussed below) upon which the video game application is implemented, a first location of a first user within a video game environment and a second location of a second user within the video game environment. The video game application may determine this location based on x, y, z coordinates of each avatar in the video game environment relative to the x, y, z coordinates defining the video game environment (and objects within the video game environment). For example, boundary 104 may be defined in the video game environment through a series of x, y, z coordinates that define a rectangular space (e.g., a wall) in the video game environment. Likewise, the location of the users may correspond to the locations of the respective avatars (e.g., a center point of the avatar, a three-dimensional space of the video game environment that is currently occupied by the avatar, or a point, e.g., corresponding to a line of sight, within the three-dimensional space of the video game environment that is currently occupied by the avatar, and/or any other area within the video game environment occupied by an avatar of the first user) of the users. As referred to herein, an "avatar" may be any graphical representation of a user or the user's alter ego or character. The avatar may be a three-dimensional avatar (e.g., modeled through the use of a series of polygons) or a two-dimensional avatar. By determining the locations of the users, the video game application can establish a trajectory between the two users that can be used when facilitating audio communications between the users.

In FIG. 1, the video game application has detected, using the control circuitry, a user interaction of the second user with the video game environment. For example, a user interaction includes an audio communication (e.g., "John, I'm behind this wall") and/or other actions performed by the user in the video game environment (e.g., knocking on boundary 104). By detecting the user interaction, the video game application is triggered to generate the hybrid audio/video approach to communicating the user interaction within the video game environment. As referred to herein, a "user interaction" may be any action caused by, or in response to (directly or indirectly) a user (and/or an avatar of a user) that influences or causes a reaction in the video game environment or the video game. For example, the user interaction may include an audio communication (e.g., spoken into a microphone of one user at one real-world location that is remote to a second real-world location of a second user) that is heard by the second user through a speaker at the second real-world location. As referred to herein, "the real world" may correspond to the non-video game environment in which users of the video game exist. In another example, a user interaction may include in-game actions that result in an audio communication (e.g., an avatar of a user moves an in-game object, the movement of which is heard by the second user through a speaker at the second real-world location).

In FIG. 1, the video game application determines, using the control circuitry, an on-screen graphic location for on-screen graphic 102 corresponding to the user interaction. The video game application determines this location based on a plurality of factors in order to reflect the conditions and positions of objects in the video game environment. For example, the video game application may key the location of the on-screen graphic to the line of sight of the first user. For example, in a video game environment having a first-person perspective, the line of sight of the first user may correspond to the eye level of the avatar of the first user. As referred to herein, "a line of sight" may refer to a straight line along which an observer (e.g., the first user) has unobstructed vision. The line of sight may include a range as indicated by a particular angle (e.g., mimicking the wide angle that a person in the real world may see). The video game application may determine the line of sight of a user based on a predetermined angle (or angles in multiple orientations) as well as the presence of in-game objects that may obstruct the line of sight (e.g., the second user is behind boundary 104 and thus not in the user's line of sight).

For example, the video game application may determine the location of on-screen graphic 102 by determining line-of-sight boundaries, within the video game environment, from a perspective of the first user at the first location (e.g, determining the x, y, z coordinates that define the surfaces of objects and boundaries in the video game environment). The video game application may determine a first trajectory from the first location to the second location within the video game environment. For example, by determining the trajectory from the first location to the second location, the video game application may determine both the trajectory of pointer 106 of the on-screen graphic, line-of-sight boundaries between the user and an object, and/or a distance between the first and second location.

The video game application may determine a line-of-sight boundary (e.g., boundary 104), of the line-of sight boundaries, intersected by the first trajectory. For example, the video game application may determine a plane in the three-dimensional boundaries of the video game environment that is intersected by the trajectory. In FIG. 1, the video game application has determined point 108 in the boundary 104 that is intersected by the first trajectory. For example, point 108 may correspond to point 108 at which the plane in the three-dimensional boundaries of the video game environment is intersected by the trajectory. The video game application may then determine a plane that includes point 108 and is perpendicular to a line of sight of the first user and select the on-screen graphic location within the plane. By determining the plane that includes point 108 and is perpendicular to a line of sight of the first user and locating on-screen graphic 102 within that plane, on-screen graphic 102 may appear to the first user in a two-dimensional form, which can easily be read. Furthermore, by locating on-screen graphic 102 within that plane, the first user is intuitively cued to the location of the second user without the need for pointer 106. However, to give a more precise location of the second user, the video game application has included pointer 106.

In FIG. 1, the video game application has determined, using the control circuitry, a second trajectory from the on-screen graphic location to the point 108 and has generated on-screen graphic 102 at the on-screen graphic location, wherein the on-screen graphic includes pointer 106 along the second trajectory. For example, the on-screen graphic may appear as a text box with a transcription, emoji, etc., corresponding to the user interaction. Pointer 106 may point from on-screen graphic 102 to the location of the second user. The point may further provide the first user with an intuitive cue to the location of the second user. It should be noted that point 106 may take any form that further indicates the location of the second user.

Figure 2:
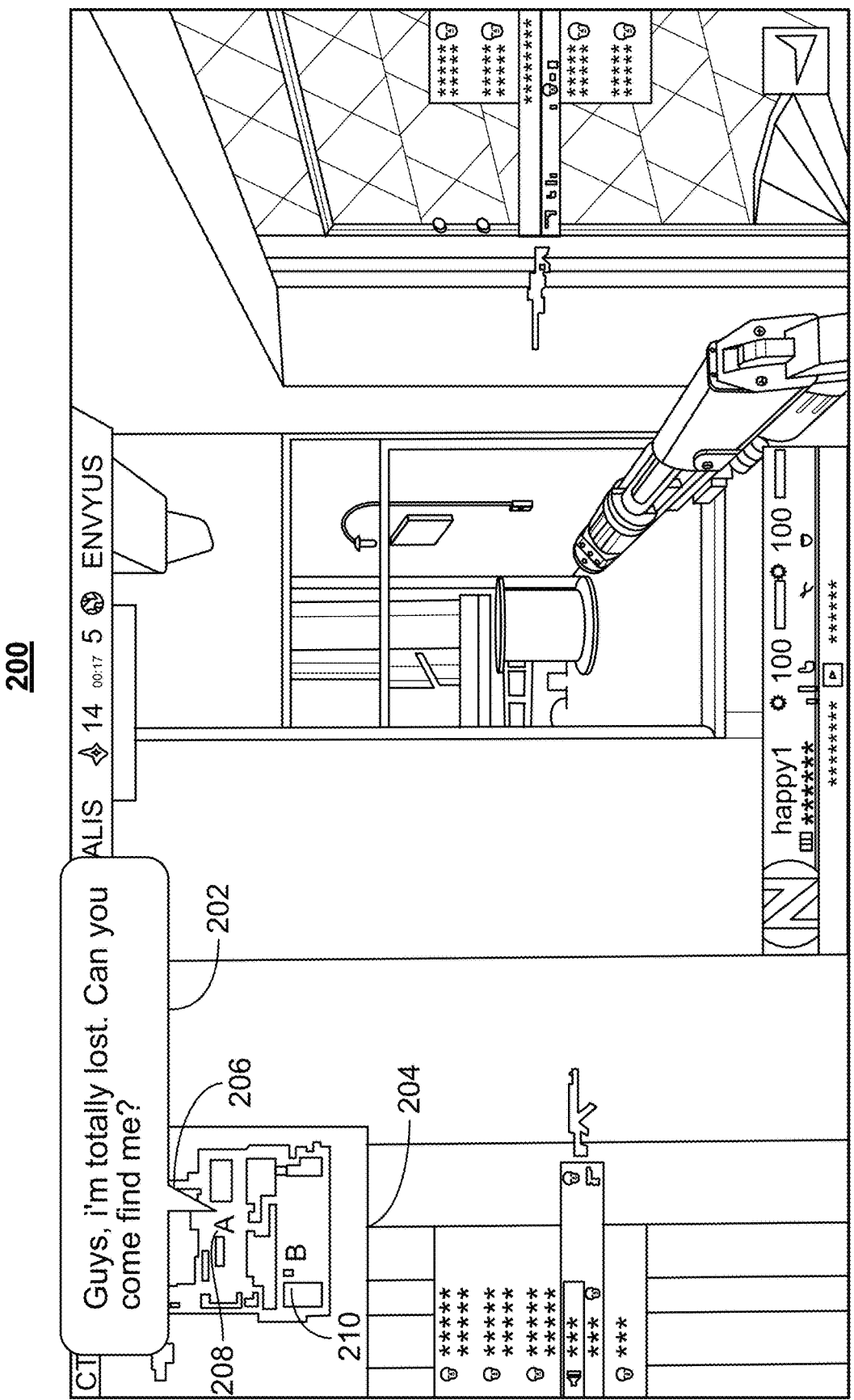
FIG. 2 shows another illustrative example of a video game application that displays an on-screen graphic that points to an on-screen map in a first-person perspective in accordance with some embodiments of the disclosure.

FIG. 2 shows another illustrative example of a video game application that displays an on-screen graphic that points to an on-screen map in a first-person perspective. In FIG. 2, the video game application further determines whether or not to present an on-screen graphic (e.g., despite receiving a user interaction) based on the distance between the first and second user. For example, the video game application may determine a distance, within the video game environment, between first location 208 and second location 210. The distance between the two locations can be determine based on the absolute length between first location 208 and second location 210 (e.g., as the crow flies) in the video game environment. Alternatively or additionally, the number of, and composition of, objects between first location 208 and second location 210 may affect the determined distance. For example, the relative distance between two locations in the video game environment may be determined to be greater if multiple objects (e.g., walls) are situated between first location 208 and second location 210. In FIG. 2, the video game application compares the distance between first location 208 and second location 210 to a threshold distance. For example, the threshold distance may correspond to a minimum distance in which on-screen graphics (e.g., on-screen graphic 204) are generated relative to a trajectory between the locations of the first and second user (e.g., first location 208 and second location 210).

In response to the video game application determining that the distance is within the threshold distance, the video game application may determine to generate for display on-screen graphic 204 relative to a trajectory between the locations of the first and second user (e.g., as shown in FIG. 1). Alternatively, in response to the video game application determining that the distance is equal to or exceeds the threshold distance, the video game application may determine not to generate for display on-screen graphic 202. By performing this determination, the video game application mimics real-world environments, in which a person may hear only user interactions that occur in close proximity to his location. In FIG. 2, in response to the video game application determining that the distance is equal to or exceeds the threshold distance, the video game application identifies a second point based on a position of the second user on on-screen map 204, determines a third trajectory from the on-screen graphic location to the second point, and generates on-screen graphic 202 at the on-screen graphic location, wherein the on-screen graphic includes a pointer along the third trajectory. For example, if the video game application determines that the second user is not within a threshold proximity such that generating the on-screen graphic pointing to the user effectively indicates the location of the second user, the video game application may instead point to the second user's location in a map of the video game environment.

Figure 3:
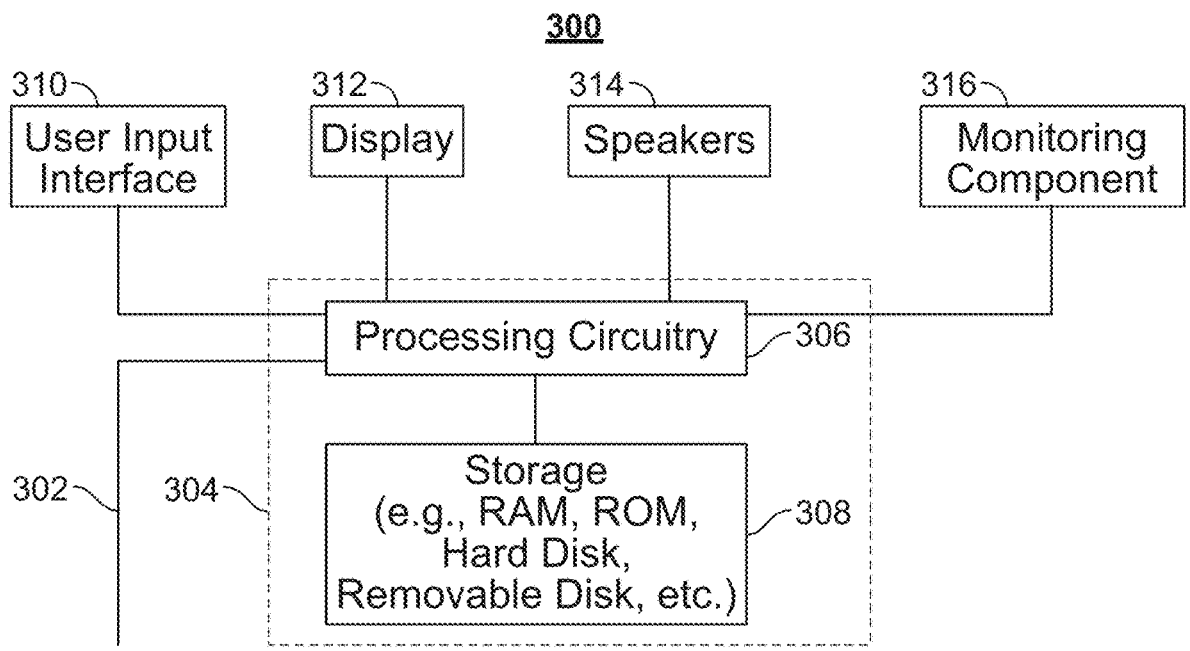
FIG. 3 is a block diagram of an illustrative user equipment device in accordance with some embodiments of the disclosure.

Users may access the video game environment and the video game application from one or more of their user equipment devices. FIG. 3 shows a generalized embodiment of illustrative user equipment device 300, which may in some embodiments constitute a device capable of presenting a video game environment and/or implementing the video game application. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a video game application stored in memory (i.e., storage 308). Specifically, control circuitry 304 may be instructed by the video game application to perform the functions discussed above and below. For example, the video game application may provide instructions to control circuitry 304 to generate the video game displays. In some implementations, any action performed by control circuitry 304 may be based on instructions received from the video game application.

In client-server based embodiments, control circuitry 304 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-topeer communication of user equipment devices, or communication of user equipment devices in locations remote from each other (described in more detail below).

Control circuitry 304 may also perform multiple computations in order to determine a trajectory as described herein and/or to determine one or more locations. For example, using standard mathematical calculations the video game application may determine the direction and distance between two locations.

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as video game information, described above, and guidance application data, described above. Storage 308 may be used to store various types of content described herein as well as video game data and guidance application data that are described above. Non-volatile memory may also be used (e.g., to launch a boot-up routine and other instructions). Cloud-based storage, described in relation to FIG. 4, may be used to supplement storage 308 or instead of storage 308.

In some embodiments, storage 308 may include coordinates of one or more locations and/or display devices. For example, the video game application may access storage 308 when determining where a display device for presenting a selected media asset is located. In another example, storage 308 may indicate what display devices are available at a particular location (e.g., when the video game application is selecting among a plurality of display devices.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces.

In some embodiments, user input interface may be incorporated into user equipment device 300 or may be incorporated into another device accessible by user equipment device 300. For example, if user equipment device 300 is a user optical device, surface space limitation may prevent user input interface from recognizing one or more input types. In such case, user input interface 310 may be implemented on a separate device that is accessible to control circuitry 304 (FIG. 3)).

Display 312 may be provided as heads-up display for user equipment device 300. In some embodiments, if user equipment device 300 is a user optical device configured as headwear, display 312 may constitute a lens or similar feature of the headwear. In some embodiments, display 312 may be one or more of a monitor, a television, a liquid crystal display (LCD) for a mobile device, or any other suitable equipment for displaying visual images generated by the video game application while also allowing a user to see physically existing objects within his/her field of vision. In some embodiments, display 312 may be HDTV-capable. In some embodiments, display 312 may include video game and/or 3D display properties, and the interactive video game application and any suitable content may be displayed in holograms and/or 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images.

User equipment device 300 may also incorporate or be accessible to detection module 316. Detection module 316 may further include various components (e.g., a video detection component, an audio detection component, object recognition component, etc.). In some embodiments, detection module 316 may include components that are specialized to generate particular information (e.g., determining whether or not an in-game user interaction is occurring).

In some embodiments, detection module 316 may include a content recognition component. The content recognition component may use object recognition techniques such as edge detection, pattern recognition, including, but not limited to, self-learning systems (e.g., neural networks), optical character recognition, on-line character recognition (including but not limited to dynamic character recognition, real-time character recognition, intelligent character recognition), and/or any other suitable technique or method to identify objects.

The video game application may receive data in the form of a video from detection module 316. The video may correspond to the direction that a user optical device is currently pointed. Furthermore, the video may cover the entire field of vision of the user. The video may include a series of frames. For each frame of the video, the video game application may use a content recognition module or algorithm to determine the objects (e.g., hands of a user) in the frame. Detection module 316 may also determine the bounds of each detected object and describe those bounds in terms of global positioning coordinates retrieved from the global positioning module. The detected objects and the coordinates for those objects may then be sent to control circuitry 304 to determine whether or not those bounds correspond to the bounds of video game content.

The video game application may then match the coordinates defining the bounds of the video game media content that is presented to the coordinates of the bounds of the object. Furthermore, the video game application may determine a position of the user and/or avatar of the user and adjust the video game content based on the position of the user (e.g., ensuring that the video game content reacts appropriately to user interactions).

In some embodiments, detection module 316 may include an eye contact detection component, which determines or receives a location upon which one or both of a user's eyes are focused (e.g., as discussed below in relation to FIG. 7). The location upon which a user's eyes are focused is referred to herein as the user's "gaze point." In some embodiments, the eye contact detection component may monitor one or both eyes of a user of user equipment 300 to identify a gaze point at a position on display 312 for the user as well as a line-of-sight of the user. The eye contact detection component may additionally or alternatively determine whether one or both eyes of the user are focused on a position associated video game environment (e.g., indicating that a user is focusing on a particular portion of the video game). In some embodiments, the eye contact detection component includes one or more sensors that transmit data to processing circuitry 306, which determines a user's gaze point. The eye contact detection component may be integrated with other elements of user equipment device 300, or the eye contact detection component, or any other component of detection module 316, and may be a separate device or system in communication with user equipment device 300.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the video game application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the video game application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
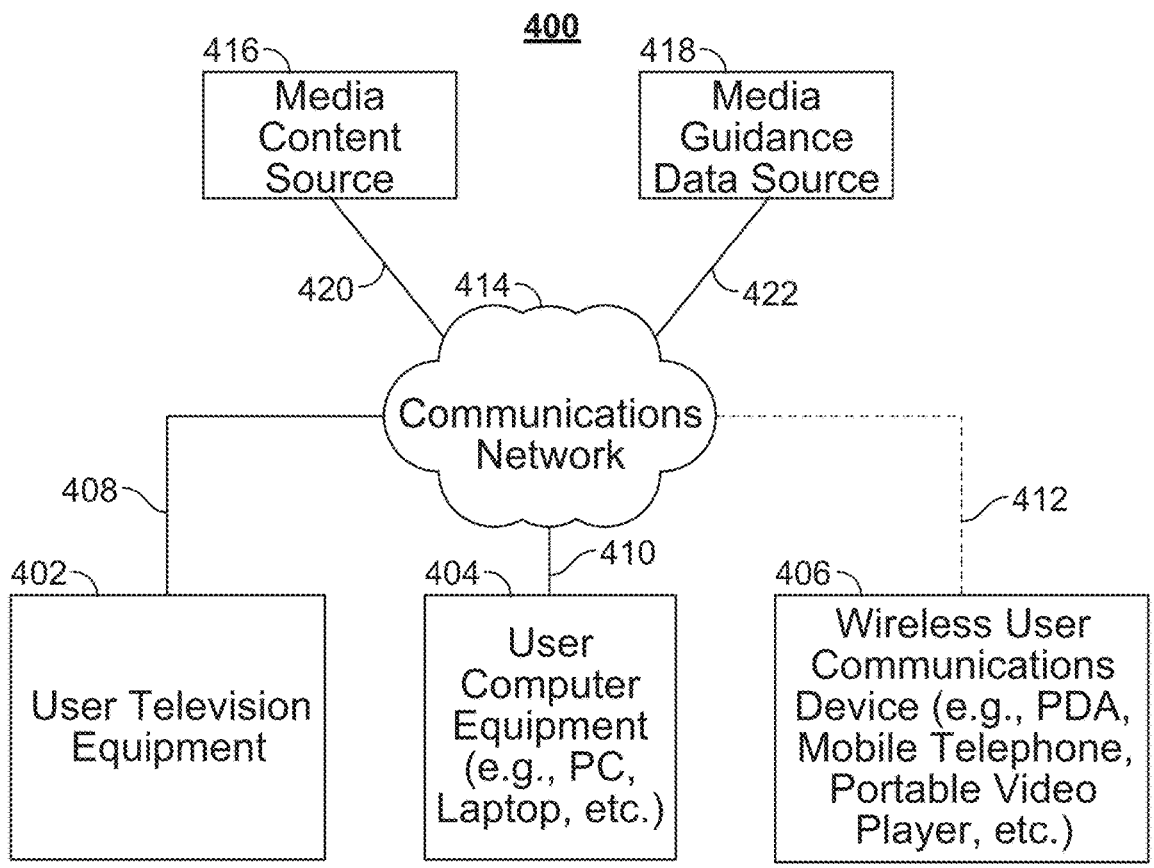
FIG. 4 is a block diagram of an illustrative media system in accordance with some embodiments of the disclosure.

User equipment device 300 of FIG. 3 can be implemented in system 400 of FIG. 4 as user equipment 402, first video game interface 404, second video game interface 406, or any other type of user equipment suitable for presenting/accessing video game media content, such as a non-portable gaming machine. For simplicity, these devices may be referred to herein collectively as user equipment or user equipment devices, and may be substantially similar to user equipment devices described above. User equipment devices, on which a video game application may be implemented, may function as a stand-alone device or may be part of a network of devices. Various network configurations of devices may be implemented and are discussed in more detail below.

In some embodiments, user equipment 402 device and first video game interface 404 or second video game interface 406 utilizing at least some of the system features described above in connection with FIG. 3 may not be classified solely as user equipment or user optical devices. For example, in some embodiments, user equipment or video game interfaces may act like television equipment (e.g., include a tuner allowing for access to television programming) and user computer equipment (e.g., be Internet-enabled allowing for access to Internet content). The video game application may have the same layout on various different types of user equipment or may be tailored to the display capabilities of the user equipment. For example, on user computer equipment, the guidance application may be provided as a web site accessed by a web browser. In another example, the guidance application may be scaled down for wireless user communications devices (e.g., smartphones). If a user device is not capable of presenting video game media content, the video game application may present substitute content instead. Additionally or alternatively, if a user device is capable of presenting video game media content, the video game application may present video game media content as a default.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user equipment 402, first video game interface 404, second video game interface 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent video game application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user equipment 402, first video game interface 404, and second video game interface 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and video game data source 418 coupled to communications network 414 via communication paths 420 and 422, respectively. Paths 420 and 422 may include any of the communication paths described above in connection with paths 408, 410, and 412. Communications with the content source 416 and video game data source 418 may be exchanged over one or more communications paths, but are shown as a single path in FIG. 4 to avoid overcomplicating the drawing. In addition, there may be more than one of each of content source 416 and video game data source 418, but only one of each is shown in FIG. 4 to avoid overcomplicating the drawing. (The different types of each of these sources are discussed below.) If desired, content source 416 and video game data source 418 may be integrated as one source device. Although communications between sources 416 and 418 with user equipment 402, first video game interface 404, and second video game interface 406 are shown as through communications network 414, in some embodiments, sources 416 and 418 may communicate directly with user equipment 402, first video game interface 404, and second video game interface 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Video game data source 418 may provide video game data, such as the video game data described above. Video game application data may be provided to the user equipment devices using any suitable approach. In some embodiments, the guidance application may be a stand-alone interactive television program guide that receives program guide data via a data feed (e.g., a continuous feed or trickle feed).

Program schedule data and other guidance data may be provided to the user equipment on a television channel sideband, using an in-band digital signal, using an out-of-band digital signal, or by any other suitable data transmission technique. Program schedule data and other video game data may be provided to user equipment on multiple analog or digital television channels.

In some embodiments, guidance data from video game data source 418 may be provided to users' equipment using a client-server approach. For example, a user equipment device may pull video game data from a server, or a server may push video game data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Video game may be provided to the user equipment with any suitable frequency (e.g., continuously, daily, a user-specified period of time, a system-specified period of time, in response to a request from user equipment, etc.). Video game data source 418 may provide user equipment 402, first video game interface 404, and second video game interface 406 the video game application itself or software updates for the video game application.

Video game applications may be, for example, stand-alone applications implemented on user equipment devices. For example, the video game application may be implemented as software or a set of executable instructions which may be stored in storage 308, and executed by control circuitry 304 of a user equipment device 300. In some embodiments, video game applications may be client-server applications where only a client application resides on the user equipment device, and server application resides on a remote server. For example, video game applications may be implemented partially as a client application on control circuitry 304 of user equipment device 300 and partially on a remote server as a server application (e.g., video game data source 418) running on control circuitry of the remote server. When executed by control circuitry of the remote server (such as video game data source 418), the video game application may instruct the control circuitry to generate the guidance application displays and transmit the generated displays to the user equipment devices. The server application may instruct the control circuitry of the video game data source 418 to transmit data for storage on the user equipment. The client application may instruct control circuitry of the receiving user equipment to generate the guidance application displays.

Content and/or video game data delivered to user equipment 402, first video game interface 404, and second video game interface 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide video game data described above. In addition to content and/or video game data, providers of OTT content can distribute video game applications (e.g., web-based applications or cloud-based applications), or the content can be displayed by video game applications stored on the user equipment device.

Video game system 400 is intended to illustrate a number of approaches, or network configurations, by which user equipment devices and sources of content and guidance data may communicate with each other for the purpose of accessing content and providing video game. The embodiments described herein may be applied in any one or a subset of these approaches, or in a system employing other approaches for delivering content and providing video game. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various video game information or settings to be communicated between the different user equipment devices. For example, it may be desirable for users to maintain consistent video game application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain video game. For example, some users may have home networks that are accessed by in-home and mobile devices. Users may control in-home devices via a video game application implemented on a remote device. For example, users may access an online video game application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a video game application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their video game application to communicate directly with content source 416 to access content. Specifically, within a home, users of user equipment 402, first video game interface 404, and second video game interface 406 may access the video game application to navigate among and locate desirable content. Users may also access the video game application outside of the home using first video game interface 404, and they may also use second video game interface 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more video game data sources 418. In addition or in the alternative, the remote computing sites may include other user equipment devices, such as user equipment 402, first video game interface 404, and second video game interface 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally stored content.

A user may use various content capture devices, such as camcorders, microphones, digital cameras with video mode, audio recorders, mobile phones, and handheld computing devices, to record content. The user can upload content to a content storage service in the cloud either directly, for example, from user equipment 402, first video game interface 404, or second video game interface 406, or, alternatively, the user can first transfer the content to a user equipment device, such as user equipment 402, first video game interface 404, or second video game interface 406. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a video game application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

FIG. 5 shows an illustrative example of a video game application that displays an on-screen graphic in a third-person perspective. For example, video game environment 500 includes multiple objects (e.g., in-game object 508) and boundaries in which avatar 502 of a first user may interact. Additionally, video game environment 500 includes on-screen graphic 506. In FIG. 5, on-screen graphic 506 represents graphical element 510. Graphical element 510 may be a non-textual, graphical element (e.g., a small digital image or icon used to express an idea, emotion, etc., in electronic communication). In FIG. 5, graphical element 510 is in the form of a tree. The video game application may modify the size of on-screen graphic 506 to further provide intuitive cues to the location of the second user. For example, in FIG. 5, the video game application determines a size of on-screen graphic 506 based on distance 512, within the video game environment, between a first location (e.g., a location of avatar 502) and the second location (e.g., a location the avatar of the user whose interaction triggered the display of on-screen graphic 506. In such cases, user interactions from users closer to the first user may appear bigger (e.g., imitating the real-world condition that sounds are heard as louder the closer the user is to the source of the sound) than similar user interactions from users farther away. Alternatively or additionally, the video game application may determine a size of on-screen graphic 506 based on a ratio between a first distance and a second distance, wherein the first distance equals a distance, within the video game environment, between the first location and the first point along the first trajectory, and wherein the second distance equals a distance, within the video game environment, between the first point and the second location along the first trajectory. In such cases, user interactions from users at a short distance behind a wall, in the video game environment, that is a long distance from the first user, would appear differently than users at a long distance behind a wall, in the video game environment, that is a short distance from the first user, even though the total distance is the same in each case (e.g., imitating the real-world condition that sound may be prevented by a solid object, but quickly disperse after penetrating the solid object).

Figure 6:
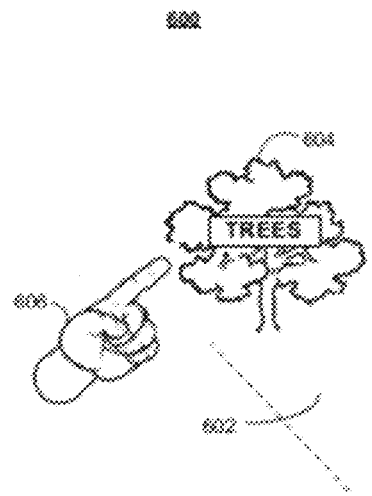
FIG. 6 shows an illustrative example of a user interaction in accordance with some embodiments of the disclosure.

FIG. 6 is an illustrative example of a user interaction selecting a portion of video game media content. In some embodiments, the video game application may select the portion of a video game structure (e.g., video game structure 506 (FIG. 5)) based on a user input defining geometric bounds of the portion of the video game structure. For example, the video game application may receive a hand motion from a user virtually tracing a portion of the video game structure as it is presented by a video game interface (e.g., first video game interface 404 (FIG. 4)) or as it appears through a user optical device.

FIG. 6 shows an illustrative example of a user interaction. For example, in some embodiments, the video game application may compare the user interaction to a database listing presentation formats associated with different user interactions to determine a presentation format of an on-screen graphic associated with the user interaction. For example, the video game application may have presentation formats that are specific to particular user interactions (e.g., red boxes for audio communications, custom designs for specific in-game actions, etc.). By providing the different presentation formats, the intuitiveness of the cues is further increased. As referred to herein, "a presentation format" may include the shape, size arrangement, medium and/or any other audio/visual characteristic in which a user communication is communicated in the video game environment.

In FIG. 6, user 606 (or an avatar corresponding to user 606) touches in-game object 604, which results with a user interaction with object 604. For example, as user 606 moves about video game environment 600, user 606 may interact with objects or boundaries (e.g., boundary 602). For example, a video game application may incorporate and/or have access to a detection module (e.g., detection module 316 (FIG. 3)) that may determine coordinates (e.g., x, y, and z spatial coordinates and/or any other suitable coordinate system) associated with a user interaction. The coordinates may then be used by the video game application (e.g., processed by processing circuitry 306 (FIG. 3)) to determine the bounds of the video game environment and/or objects within the video game environment that were interacted with by the user.

For example, in response to a determining a set of coordinates, the video game application may generate a set of connections between the coordinates that form the borders of the video game media content. In some embodiments, the connections may take the form of straight lines, curves, etc., between the points. Alternatively or additionally, the connections may be adjusted based on the video game content (e.g., in-game objects) near the connection. For example, if an object is near a boundary (e.g., boundary 602) of a video game environment, the video game application may adjust the curvature of the connection between points corresponding to the object as the object interacts with the boundary (i.e., simulating object being pushed together against the boundary). For example, if object 604 corresponds to x, y coordinates of (0, 4), (4, 0), (4, 8) and a user interacts with corresponding to (0, 4) and (4, 8), the video game application may automatically determine (e.g., via processing circuitry 306 (FIG. 3)), point (4, 0) as a boundary to the portion of the video game object being interacted with by the user.

After the video game application determines one or more portions of a video game object or environment have been interacted with, the video game application may determine a video game function to perform with respect to the user interaction. For example, the video game application may detect an avatar interacts with a wall in the video game environment. In response, the video game application may generate an on-screen graphic indicating that the user "bumped" into the wall. For example, the video game application may execute commands (e.g., related to video game functions) in response to user interactions detected (e.g., via detection module 316 (FIG. 3)) near one or more objects or may execute commands in response to user inputs received via a user device that are not video game interfaces (e.g., an audio communication).

In some embodiments, the video game application may detect a trajectory associated with a user interaction (e.g., performed by user 606) by monitoring the path and velocity associated with the user interaction (e.g., the movement of a user while the user is within a predetermined proximity to a video game object (e.g., object 604). Based on the trajectory and the user interaction, the video game application may select components of a video game animation associated with the selection or other video game functions. For example, the video game application may cross-reference the detected user interaction (e.g., detected via detection module 316 (FIG. 3)) with a database listing video game functions associated with different user interactions. For example, in response to detecting a user bumping a wall at a low speed, the video game application may not trigger an on-screen graphic. However, if the user is moving at a high speed, the video game application may generate an on-screen graphic. Additionally or alternatively, in response to a throwing, sliding, pushing, flicking, etc., motion relative to an in-game object, the video game application may determine to generate for display a video game animation for the object along with an on-screen graphic. Furthermore, the components (e.g., velocity, direction, etc.) of the user interaction may influence the video game animation.

Additionally or alternatively, if the video game application determines that the user interaction (e.g., as it passes near video game structure 602) had a high velocity (e.g., associated with a forceful user interaction), the video game application may select a size or presentation format associated with the high velocity. In contrast, if the video game application determines that the user interaction (e.g., as it passes near the object) had a low velocity (e.g., associated with a weak user interaction), the video game application may select a smaller size.

In some embodiments, the trajectory of a user interaction may also affect the trajectory of a pointer for an on-screen graphic. For example, when the video game application determines (e.g., via processing circuitry 306 (FIG. 3)) a trajectory associated with a user interaction, the video game application may determine one or more components of the trajectory. For example, the video game application may determine a direction, distance, speed, etc., associated with the user interaction. The video game application may then generate a pointer that indicates one or more components of the user interaction.

Figure 7:
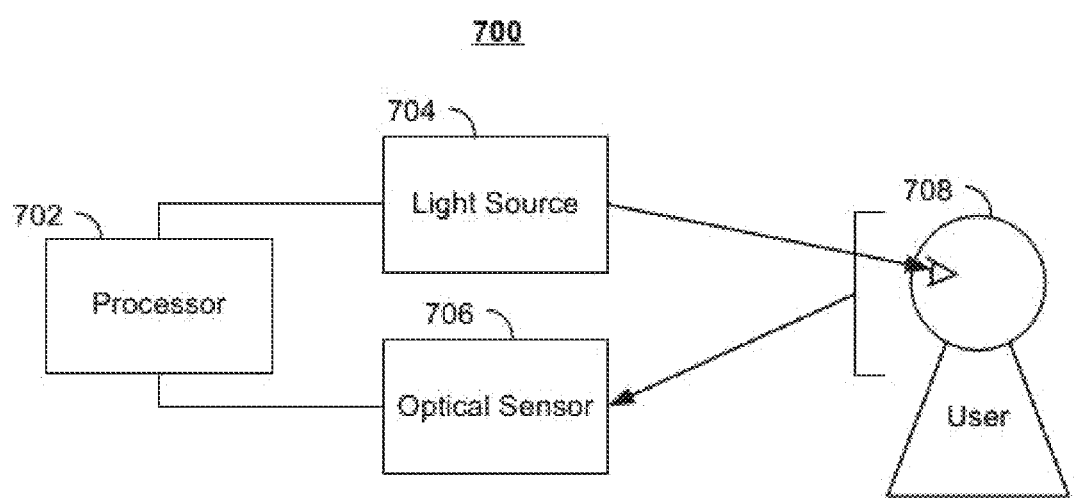
FIG. 7 is an illustrative example of a component used to determine a location at which a user is focusing in an augmented reality or virtual reality embodiment in accordance with some embodiments of the disclosure.

FIG. 7 is an illustrative example of a component used to determine a location at which a user is focusing in an augmented reality or virtual reality embodiment. FIG. 7 shows eye contact detection component 700, which may be used to identify the gaze point of a user of user equipment 300 (FIG. 3), in order to determine whether or not a user is focusing on a particular portion of a video game environment and/or determine a line of sight of a user and/or avatar. For example, the location upon which a user's eyes are focused may determine whether or not the video game application selects one object over another. For example, eye contact detection component 700 may determine whether one or both eyes of the user are focused on a position relative to a video game environment.

Eye contact detection component 700 includes processor 702, light source 704, and optical sensor 706. Light source 704 transmits light that reaches at least one eye of a user, and optical sensor 706 is directed at the user to sense reflected light. Optical sensor 706 transmits collected data to processor 702, and based on the data received from optical sensor 706, processor 702 determines a user's gaze point.

In some embodiments, eye contact detection component 700 is configured for determining a gaze point of a single user. In other embodiments, eye contact detection component 700 may determine gaze points for a plurality of users. Eye contact detection component 700 may also identify multiple users of user devices (e.g., user equipment device 300 (FIG. 3)). For example, eye contact detection component 700 may determine the one or more portions upon which a plurality of users in a video game environment are focusing on a line of sight of a user.

Processor 702 may be integrated with one or more light sources 704 and one or more optical sensors 706 in a single device. Additionally or alternatively, one or more light sources 704 and one or more optical sensors 706 may be housed separately from processor 702 and in wireless or wired communication with processor 702. One or more of processors 702, light sources 704, and optical sensors 706 may be integrated into a user device (e.g., user equipment device 300 (FIG. 3).

Processor 702 may be similar to processing circuitry 306 (FIG. 3) described above. In some embodiments, processor 702 may be processing circuitry 306 (FIG. 3), with processing circuitry 306 in communication with light source 704 and optical sensor 706. In other embodiments, processor 702 may be separate from but optionally in communication with processing circuitry 306.

Light source 704 transmits light to one or both eyes of one or more users. Light source 704 may emit, for example, infrared (IR) light, near infrared light, or visible light. The light emitted by light source 704 may be collimated or non-collimated. The light is reflected in a user's eye, forming, for example, the reflection from the outer surface of the cornea (i.e., a first Purkinje image), the reflection from the inner surface of the cornea (i.e., a second Purkinje image), the reflection from the outer (anterior) surface of the lens (i.e., a third Purkinje image), and/or the reflection from the inner (posterior) surface of the lens (i.e., a fourth Purkinje image).

Optical sensor 706 collects visual information, such as an image or series of images, of one or both of one or more users' eyes. Optical sensor 706 transmits the collected image(s) to processor 702, which processes the received image(s) to identify a glint (i.e., corneal reflection) and/or other reflection in one or both eyes of one or more users. Processor 702 may also determine the location of the center of the pupil of one or both eyes of one or more users. For each eye, processor 702 may compare the location of the pupil to the location of the glint and/or other reflection to estimate the gaze point. Processor 702 may also store or obtain information describing the location of one or more light sources 704 and/or the location of one or more optical sensors 706 relative to a video game environment. Using this information, processor 702 may determine a user's gaze point or line of sight.

In some embodiments, eye contact detection component 700 performs best if the position of a user's head is fixed or relatively stable. In other embodiments, eye contact detection component 700 is configured to account for a user's head movement, which allows the user a more natural viewing experience than if the user's head were fixed in a particular position.

In some embodiments accounting for a user's head movement, eye contact detection component 700 includes two or more optical sensors 706. For example, two cameras may be arranged to form a stereo vision system for obtaining a 3D position of the user's eye or eyes; this allows processor 702 to compensate for head movement when determining the user's gaze point. The two or more optical sensors 706 may be part of a single unit or may be separate units. For example, a user device (e.g., user equipment device 300 (FIG. 3)) may include two cameras used as optical sensors 706, or eye contact detection component 700 in communication with the user device (e.g., user equipment device 300 (FIG. 3)) may include two optical sensors 706. In other embodiments, each of the user device (e.g., user equipment device 300 (FIG. 3)) and eye contact detection component 700 may include an optical sensor, and processor 702 receives image data from the optical sensor of the user device and the optical sensor of eye contact detection component 700. Processor 702 may receive data identifying the location of optical sensor 706 relative to a video game environment.

In other embodiments accounting for a user's head movement, eye contact detection component 700 includes two or more light sources for generating multiple glints. For example, two light sources 704 may create glints at different locations of an eye; having information on the two glints allows the processor to determine a 3D position of the user's eye or eyes, allowing processor 702 to compensate for head movement. Processor 702 may also receive data identifying the location of light sources 704 relative to the video game environment.

In some embodiments, other types of eye contact detection components that do not utilize a light source may be used. For example, optical sensor 706 and processor 702 may track other features of a user's eye, such as the retinal blood vessels or other features inside or on the surface of the user's eye, and follow these features as the eye rotates. Any other equipment or method for determining one or more users' gaze points not discussed above may be used in addition to or instead of the above-described embodiments of eye contact detection component 700.

It should be noted that eye contact detection component 700 is but one type of component that may be incorporated into or accessible by detection module 316 (FIG. 3) or the video game application. Other types of components, which may generate other types of data (e.g., video, audio, textual, etc.) are fully within the bounds of this disclosure.

Figure 8:
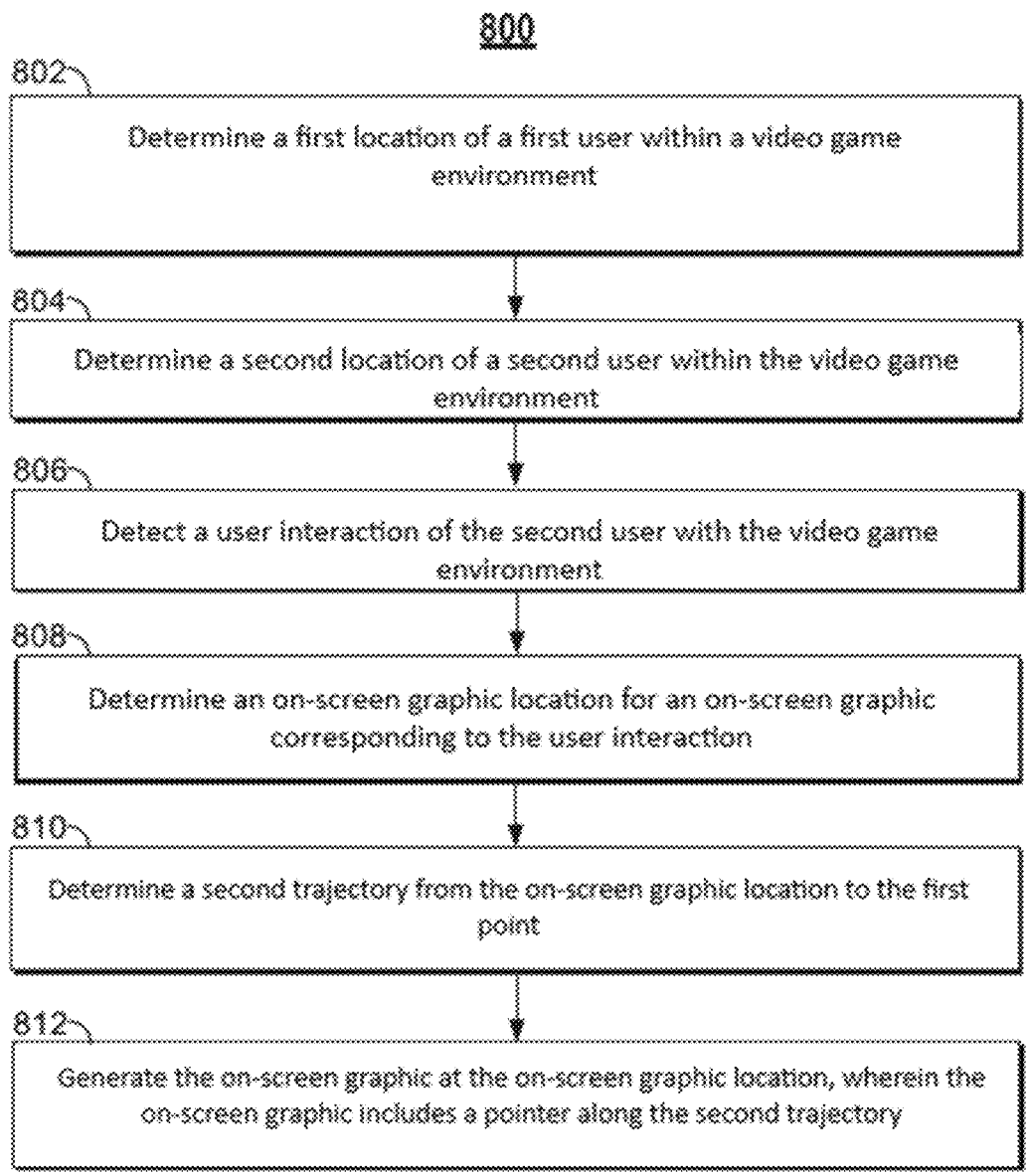
FIG. 8 is a flowchart of illustrative steps for generating for display a video game animation in accordance with some embodiments of the disclosure.

FIG. 8 is a flowchart of illustrative steps for instructing a second video game interface to generate for display a portion of the video game media content. It should be noted that process 800 or any step thereof could be performed on, or provided by, any of the devices shown in FIGS. 3-4. For example, process 800 may be executed by control circuitry 304 (FIG. 3) as instructed by a video game application implemented on user equipment 402 in order to present on-screen graphics. In addition, one or more steps of process 800 may be incorporated into or combined with one or more steps of any other process or embodiment (e.g., process 900 (FIG. 9)).

At step 802, the video game application determines, using control circuitry (e.g., control circuitry 304 (FIG. 3)), upon which the video game application is implemented, a first location of a first user within a video game environment. At step 804, the video game application determines (e.g., via control circuitry 304 (FIG. 3)) a second location of a second user within the video game environment. The video game application may determine (e.g., via control circuitry 304 (FIG. 3)) this location based on x, y, z coordinates of each avatar in the video game environment relative to the x, y, z coordinates defining the video game environment (and objects within the video game environment). For example, the location of the users may correspond to the locations of the respective avatars (e.g., a center point of the avatar, a three-dimensional space of the video game environment that is currently occupied by the avatar, or a point, e.g., corresponding to a line of sight, within the three-dimensional space of the video game environment that is currently occupied by the avatar, and/or any other area within the video game environment occupied by an avatar of the first user) of the users. By determining the locations of the users, the video game application can establish a trajectory between the two users that can be used when facilitating audio communications between the users.

At step 806, the video game application detects, using the control circuitry (e.g., control circuitry 304 (FIG. 3)), a user interaction of the second user with the video game environment. For example, a user interaction may include an audio communication (e.g., directed at one or more other users) or other action performed by the user in the video game environment that corresponds to an in-game sound (e.g., walking, opening a door, firing a gun, etc.). By detecting (e.g., control circuitry 304 (FIG. 3)) the user interaction, the video game application is triggered (e.g., control circuitry 304 (FIG. 3)) to generate the hybrid audio/video approach to communicating the user interaction within the video game environment.

At step 808, the video game application determines, using the control circuitry (e.g., control circuitry 304 (FIG. 3)), an on-screen graphic location for an on-screen graphic corresponding to the user interaction. The video game application may determine (e.g., control circuitry 304 (FIG. 3)) this location based on a plurality of factors in order to reflect the conditions and positions of objects in the video game environment. For example, the video game application may key the location of the on-screen graphic to the line of sight of the first user. By doing so, the video game application provides an intuitive pointer to the second user. Moreover, if the second user is not within the line of sight of the first user (e.g., the second user is behind an object in the video game environment), the video game application may present the on-screen graphic within the line of sight of the user with a point through the object. By doing so, the video game application indicates to the first user that the second user is behind the object.

For example, the video game application may determine (e.g., via control circuitry 304 (FIG. 3)) the location of the on-screen graphic by determining line-of-sight boundaries, within the video game environment, from a perspective of the first user at the first location (e.g., determining the x, y, z coordinates that define the surfaces of objects and boundaries in the video game environment). The video game application may determine a first trajectory from the first location to the second location within the video game environment. For example, by determining the trajectory from the first location to the second location, the video game application may determine (e.g., via control circuitry 304 (FIG. 3)) both the trajectory of a pointer of the on-screen graphic, line-of-sight boundaries between the user, and/or a distance between the first and second location. The video game application may determine (e.g., via control circuitry 304 (FIG. 3)) a line-of-sight boundary, of the line-of sight boundaries, intersected by the first trajectory. For example, the video game application may determine a plane in the three-dimensional boundaries of the video game environment that is intersected by the trajectory. The video game application may determine (e.g., via control circuitry 304 (FIG. 3)) a first point in the line-of-sight boundary that is intersected by the first trajectory. For example, the point may correspond to the point at which the plane in the three-dimensional boundaries of the video game environment is intersected by the trajectory. The video game application may then determine (e.g., via control circuitry 304 (FIG. 3)) a plane that includes the first point and is perpendicular to a line of sight of the first user and select the on-screen graphic location within the plane. By determining the plane that includes the first point and is perpendicular to a line of sight of the first user and locating the on-screen graphic within that plane, the on-screen graphic may appear to the first user in a two-dimensional form, which can easily be read. Furthermore, by locating the on-screen graphic within that plane, the first user is intuitively cued to the location of the second user without the need for the pointer.

At step 810, the video game application determines, using the control circuitry (e.g., via control circuitry 304 (FIG. 3)), a second trajectory from the on-screen graphic location to the first point. For example, the video game application may determine (e.g., via control circuitry 304 (FIG. 3)) the different components of the direction towards the first point.

At step 812, the video game application generates (e.g., via control circuitry 304 (FIG. 3)) the on-screen graphic at the on-screen graphic location, wherein the on-screen graphic includes a pointer along the second trajectory. For example, the on-screen graphic may appear as a text box with a transcription, emoji, etc., corresponding to the user interaction. The pointer may point from this graphic to the location of the second user. The point may further provide the first user with an intuitive cue to the location of the second user.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-6B could be used to perform one of more of the steps in FIG. 8.

Figure 9:
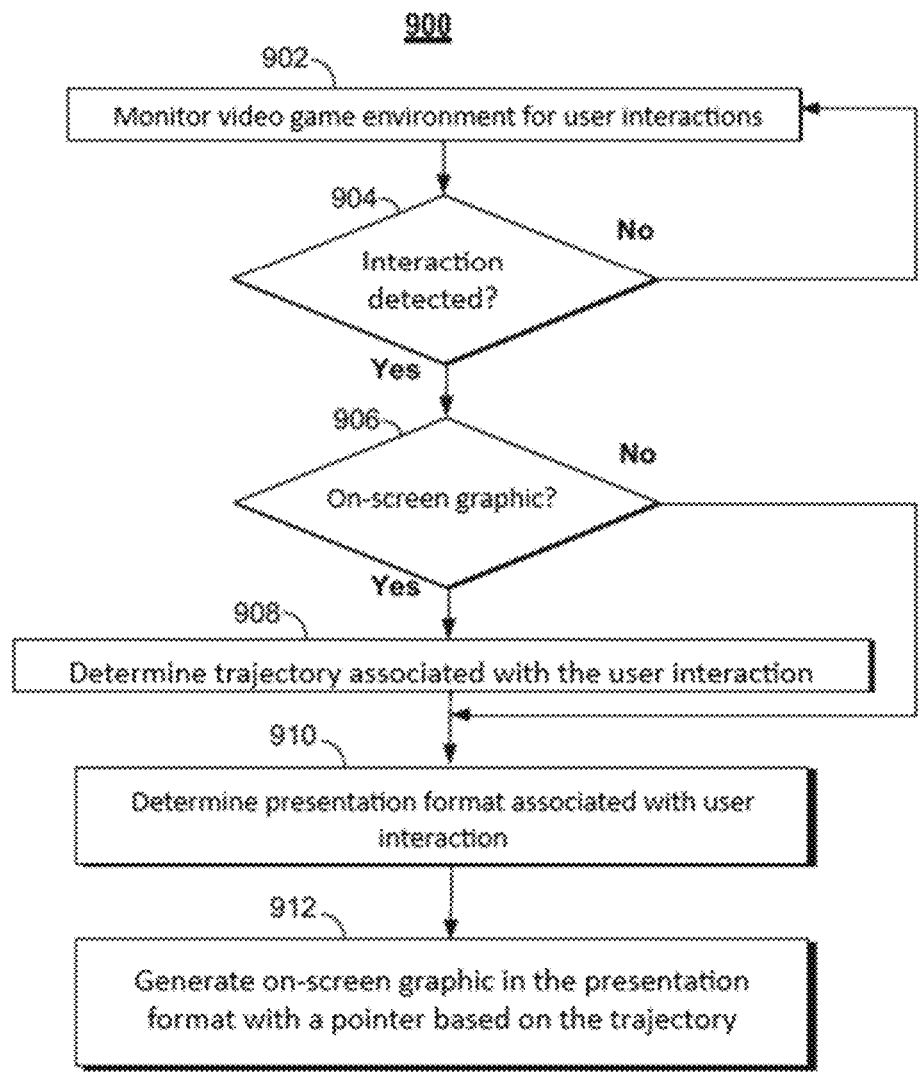
FIG. 9 is a flowchart of illustrative steps for generating an on-screen graphic with a pointer in accordance with some embodiments of the disclosure.

FIG. 9 is a flowchart of illustrative steps for generating an on-screen graphic with a pointer. It should be noted that process 900 or any step thereof could be performed on, or provided by, any of the devices shown in FIGS. 3-4. For example, process 900 may be executed by control circuitry 304 (FIG. 3) as instructed by a video game application implemented on user equipment 402 in order to generate a pointer. In addition, one or more steps of process 900 may be incorporated into or combined with one or more steps of any other process or embodiment (e.g., process 800 (FIG. 8)).

At step 902, the video game application monitors a video game environment for user interactions. For example, the video game application implemented on a user device (e.g., first video game interface 404 (FIG. 4)) may monitor for one or more user interactions via a detection module (e.g., detection module 316 (FIG. 3)). For example, a detection module incorporated into a user device (e.g., user equipment device 300 (FIG. 3)) and/or accessible by a video game application may monitor for all user interactions within the video game environment.

At step 904, the video game application determines whether or not a user interaction associated with performing a video game function is detected. For example, the video game application may determine (e.g., via processing circuitry 306 (FIG. 3)) whether or not an object (e.g., a hand of a user and/or avatar) virtually touched video game media content (e.g., object 604 (FIG. 6)). In some embodiments, determining whether or not a user "touched" the video game media content may include determining whether or not the position of an object (e.g., the hand) overlapped the coordinates associated with the object.

For example, the video game application may determine (e.g., via control circuitry 304 (FIG. 3)) whether or not a second user issued a verbal communication from a microphone. In another example, the video game application may determine (e.g., via detection module 316 (FIG. 3)) the bounds or spatial coordinates associated with a user (or part of a user). The video game application may also determine (e.g., via detection module 316 (FIG. 3) and/or processing circuitry 306 (FIG. 3)) the bounds or spatial coordinates associated with an object (e.g., object 604 (FIG. 6)). The video game application may then determine (e.g., via processing circuitry 306 (FIG. 3)) whether or not spatial coordinates associated with the user and the video game object (e.g., indicating that the user is "touching" the video game media content). If the video game application does not detect a user interaction, the video game application returns to step 902. Alternatively, in response to determining that the spatial coordinates overlap (e.g., corresponding to a user action associated with performing a function), the video game application may proceed to step 906.

At step 906, the video game application determines whether or not an on-screen graphic is associated with the user interaction. For example, the video game application may classify different user interactions and determine particular video game functions to perform based on the classification. In such cases, not all user interactions may be associated with an on-screen graphic. For example, a user interaction issuing a verbal communication may be classified as a user interaction (e.g., in a database) that corresponds to an on-screen graphic and/or a particular presentation format. In another example, the movement (e.g., approaching, but not passing through, an object associated with a video game object) of the user may not be associated with an on-screen graphic.

If the video game application determines that the user interaction is not associated with a on-screen graphic, the video game application proceeds to step 910. If the video game application determines that the user interaction is associated with a on-screen graphic, the video game application proceeds to step 908. At step 908, the video game application determines (e.g., via control circuitry 304 (FIG. 3) a trajectory associated with the user interaction. In some embodiments, the video game application may determine (e.g., via control circuitry 304 (FIG. 3)) one or more components associated with the trajectory. For example, the video game application may determine (e.g., via detection module 316 (FIG. 3)) a direction (e.g., separated into vertical and/or horizontal components) associated with a user interaction.

At step 910, the video game application determines a presentation format associated with the user interaction. For example, the video game application may input the type of user interaction into a database listing presentation formats for different types of user interactions to receive an output of a particular presentation format. For example, the video game application may select a particular presentation format for the various types of user interactions. In some embodiments, a user may be able to customize the presentation formats through the video game application.

At step 912, the video game application generates (e.g., via control circuitry 304 (FIG. 3)) an on-screen graphic in the presentation format with a pointer based on the trajectory. For example, in response to a user interaction with a particular trajectory, the video game application may select (e.g., via processing circuitry 306 (FIG. 3)) a configuration of the pointer. For example, the video game application may determine the coordinates of a point. Based on the coordinates, the video game application may determine (e.g., via processing circuitry 306 (FIG. 3)) the trajectory needed to reach that point.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one of more of the steps in FIG. 8.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different order, or done in parallel. In addition, the systems and methods described herein may be performed in real-time. It should also be noted, the systems and/or methods described above may be applied to, or used in accordance with, other systems and/or methods.

What is claimed is:

1. A method comprising:
    determining, using control circuitry, a first location within a video game environment of a first object;
    determining, using the control circuitry, a second location within the video game environment of a first avatar, wherein the first avatar corresponds to a user;
    determining, using the control circuitry, a first action corresponding to the first object;
    receiving, using the control circuitry, eye detection data related to the user;
    determining, using the control circuitry, a line of sight of the user based on the received eye detection data;
    detecting, using the control circuitry, that the line of sight of the user is directed to the first location and that a second object is located between the avatar and the first object; and
    in response to detecting that the line of sight of the user is directed to the first location and that a second object is located between the avatar and the first object, generating for display, using the control circuitry, a graphic wherein the graphic includes a pointer along the line of sight of the user.

2. The method of claim 1, further comprising determining a size of the graphic based on a distance, within the video game environment, between the first location and the second location.

3. The method of claim 1, further comprising determining a size of the graphic based on a size of the second object, within the video game environment.

4. The method of claim 1, further comprising determining a size of the graphic based on a ratio between a first distance and a second distance, wherein the first distance equals a distance, within the video game environment, between the first location and a third location within the video game environment of the second object, and wherein the second distance equals a distance, within the video game environment, between the third location and the second location.

5. The method of claim 1, further comprising determining a presentation format of the graphic by comparing the action to a database listing presentation formats associated with different types of actions.

6. The method of claim 1, further comprising:
determining that the line of sight of the user is intersected by the second object;
determining a plane associated with the second object, wherein the plane is perpendicular to the line of sight of the user; and
generating for display, using the control circuitry, the graphic within the plane.

7. The method of claim 1, wherein the second object is a second avatar.

8. The method of claim 1, further comprising:
determining a first position of a first pupil of the user using the eye detection data;
determining a second position of a second pupil of the user using the eye detection data; and
determining the line of sight of the user based on the first position of the first pupil and the second position of the second pupil.

9. The method of claim 8, further comprising:
determining a first corneal reflection of a first eye of the user using the eye detection data;
determining a second corneal reflection of a second eye of the user using the eye detection data; and
determining the line of sight of the user based on the first position of the first pupil, the second position of the second pupil, the first corneal reflection of the first eye, and the second corneal reflection of the second eye.

10. An apparatus, comprising:
control circuitry; and
at least one memory including computer program code for one or more programs, the at least one memory and the computer program code configured to, with the control circuitry, cause the apparatus to perform at least the following:
determine a first location within a video game environment of a first object;
determine a second location within the video game environment of a first avatar, wherein the first avatar corresponds to a user;
determine a first action corresponding to the first object;
receive eye detection data related to the user;
determine a line of sight of the user based on the received eye detection data;
detect that the line of sight of the user is directed to the first location and that a second object is located between the avatar and the first object; and
in response to detecting that the line of sight of the user is directed to the first location and that a second object is located between the avatar and the first object, generate for display, a graphic wherein the graphic includes a pointer along the line of sight of the user.

11. The apparatus of claim 10, wherein the apparatus is further caused to determine a size of the graphic based on a distance, within the video game environment, between the first location and the second location.

12. The apparatus of claim 10, wherein the apparatus is further caused to determine a size of the graphic based on a size of the second object, within the video game environment.

13. The apparatus of claim 10, wherein the apparatus is further caused to determine a size of the graphic based on a ratio between a first distance and a second distance, wherein the first distance equals a distance, within the video game environment, between the first location and a third location within the video game environment of the second object, and wherein the second distance equals a distance, within the video game environment, between the third location and the second location.

14. The apparatus of claim 10, wherein the apparatus is further caused to determine a presentation format of the graphic by comparing the action to a database listing presentation formats associated with different types of actions.

15. The apparatus of claim 10, wherein the apparatus is further caused to:
determine that the line of sight of the user is intersected by the second object;
determine a plane associated with the second object, wherein the plane is perpendicular to the line of sight of the user; and
generate for display, using the control circuitry, the graphic within the plane.

16. The apparatus of claim 10, wherein the second object is a second avatar.

17. The apparatus of claim 10, wherein the apparatus is further caused to:
determine a first position of a first pupil of the user using the eye detection data;
determine a second position of a second pupil of the user using the eye detection data; and
determine the line of sight of the user based on the first position of the first pupil and the second position of the second pupil.

18. The apparatus of claim 17, wherein the apparatus is further caused to:
determine a first corneal reflection of a first eye of the user using the eye detection data;
determine a second corneal reflection of a second eye of the user using the eye detection data; and
determine the line of sight of the user based on the first position of the first pupil, the second position of the second pupil, the first corneal reflection of the first eye, and the second corneal reflection of the second eye.

* * * * *